United States Patent
Jones

[11] 3,866,566
[45] Feb. 18, 1975

[54] GAUZE PAD IMPREGNATION BETWEEN BELTS

[75] Inventor: Edward W. Jones, Brigantine, N.J.

[73] Assignee: Pioneer Laboratories, Inc., Pleasantville, N.J.

[22] Filed: Sept. 28, 1972

[21] Appl. No.: 292,978

[52] U.S. Cl. .................. 118/58, 118/239, 118/257
[51] Int. Cl. ............................................. B05c 1/02
[58] Field of Search ........... 117/112; 118/257, 239, 118/58

[56] References Cited
UNITED STATES PATENTS

| | | | |
|---|---|---|---|
| 10,458 | 1/1854 | Overend | 118/257 X |
| 1,153,585 | 9/1915 | Vicars et al. | 118/257 X |
| 1,306,649 | 6/1919 | Weinheim | 118/257 X |
| 3,363,530 | 1/1968 | Rice | 118/257 X |
| 3,749,049 | 7/1973 | Schultz | 118/257 X |

Primary Examiner—John P. McIntosh
Attorney, Agent, or Firm—Smythe & Moore

[57] ABSTRACT

Individual gauze pads are fed between two moving and juxtaposed endless belts and medicant or impregnant material is applied to one of the belts and carried onto the pad as it is carried between the belts. Nip rolls are used to apply pressure to the belts at a zone where the pads are carried between the two belts so as to cause transfer of a predetermined amount of medicant to a pad.

3 Claims, 3 Drawing Figures

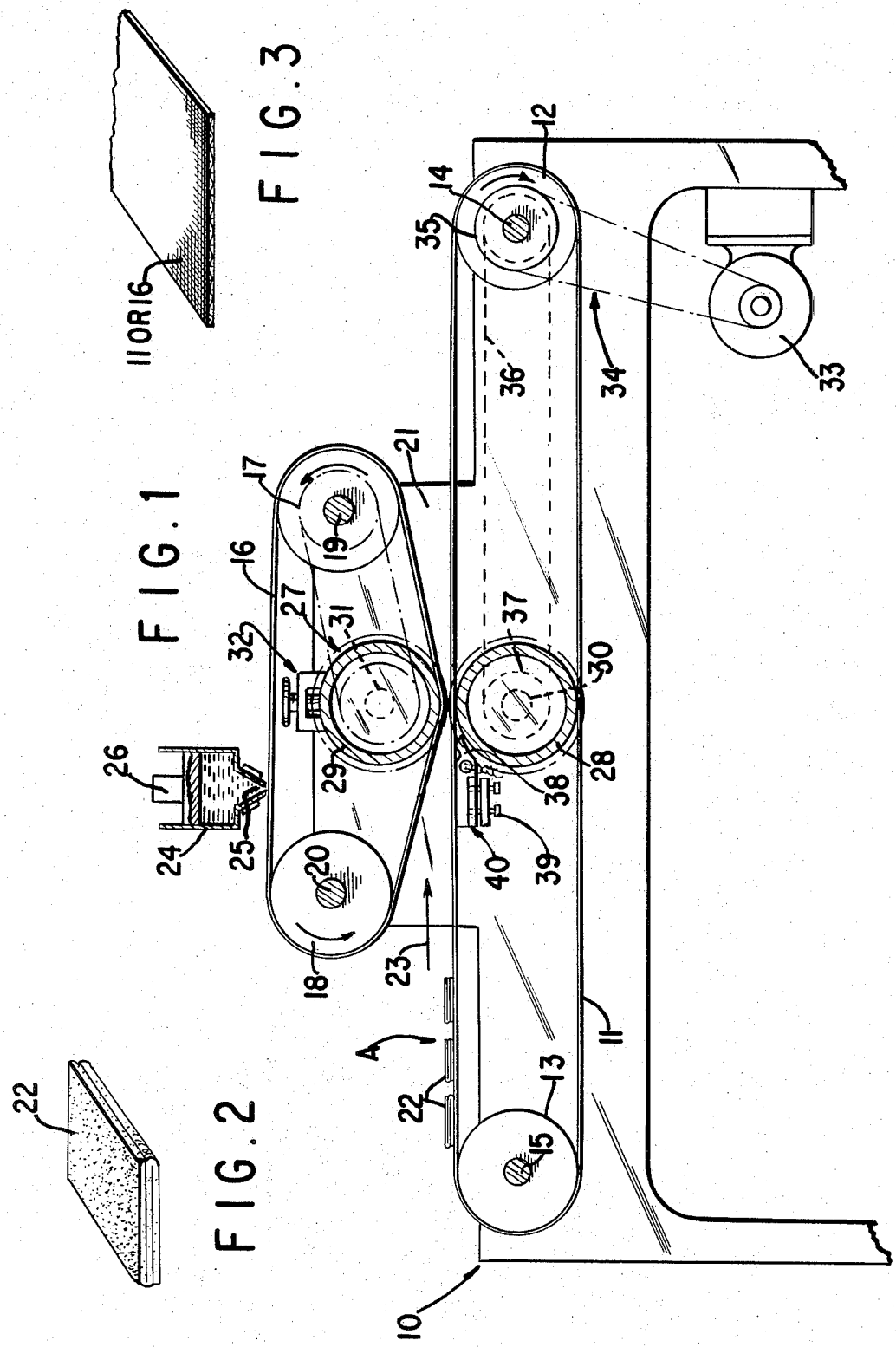

GAUZE PAD IMPREGNATION BETWEEN BELTS

The invention relates to impregnation of gauze pads with a medicant and particularly the apparatus for impregnating the pads.

Impregnated pads for application of medicant or material to the skin are known in the art. Such pads usually are placed into packages under sterile conditions so that they can be stored and transported to place of use. It has been difficult to fold or cut pads after medicant has been applied. The impregnating material varies with the use of the bandage. When the material has been applied by heating, difficulty has been encountered, especially with mixtures where heat affects the same. Such can cause separation of the oils or materials when subjected to heat. It is necessary, in many instances, to place predetermined quantities of the material on individual pads which are thereafter packaged.

One of the objects of the invention is to provide an apparatus for impregnating individual gauze pads in an improved manner.

Another of the objects of the invention is to provide an apparatus for placing a predetermined quantity of medicant on a gauze pad.

In one aspect of the invention, a first endless movable belt is provided upon which can be placed individual folded pads to be impregnated. A second movable belt is located over or adjacent the first belt, the second belt having a medicant hopper or feeder for feeding medicant to the belt for transfer to gauze pads on the first belt. A pair of nip rolls are located so that adjacent runs of the belts pass therebetween, the gauze pads being carried between the belts and through the nip rolls so that the medicant on one of the belts is transferred to the gauze in predetermined quantities. One of the nip rolls also can be arranged so that medicant is transferred to the second belt so as to ensure that medicant is applied to both sides of the folded pad.

The belts preferably are of woven material, for example, coated fiber glass. A doctor knife with a heating element can be arranged so as to apply limited heat and pressure to the belt at a point adjacent the nip rolls so as to assist in impregnation of the pads.

Other objects, advantages and features of the present invention will become apparent from the following description and drawings, which are merely exemplary.

In the drawings:

FIG. 1 is a schematic view of one form of apparatus for carrying out the invention;

FIG. 2 is an enlarged perspective view of a Z folded gauze pad which can be impregnated by the invention; and FIG. 3 is a fragmentary sectional view of the belts used.

Referring to FIG. 1, frame 10 has a lower endless belt 11 carried on lower belt rolls 12, 13 which are carried on shafts 14, 15 mounted in the frame. The second or upper belt 16 is carried on upper or applicator belt rolls 17, 18 rotatably mounted on shafts 19, 20 carried on a suitable framework 21 which is carried by frame 10.

The belts preferably are of a foraminous material. As one example, "Teflon" coated fiber glass can be used having a construction of 44 to 32 threads per square inch. "Teflon" is the registered trademark of E. I. Du Pont de Nemours and Co. for polytetrafluoroethylene. It is to be understood, however, that other material can be used and other sizes or porosity, the belt being such that it will hold the impregnant so that it can be squeezed or removed therefrom onto the gauze pads as will be explained hereafter.

In the form shown, the pads 22 are folded into a Z by suitable machinery, or by hand, cut and are placed on the belt at zone A, the belt moving in the direction indicated by arrow 23.

Upper belt 16 has the medicant or impregnant applied thereto from a hopper 24 which can be adjustably located a predetermined distance above belt 16 so as to deposit the required amount of material to the moving belt.

In order to assist in providing the regulated flow of material from opening 25, a damper 26 can be used, the damper having pressure applied thereto in any desired manner.

The hopper 24 can be adjustably held relative to belt 16 by suitable supports (not shown) so that the proper amount of material is placed on the belt to provide a predetermined amount of medicant on each square unit of the pad.

Nip rolls 27 comprise a lower nip roll 28 and upper nip roll 29, the lower nip roll 28 being carried on shaft 30. Upper roll 29 is carried by shaft 31 which can be mounted on an adjustable means 32 so as to adjust the height or distance between rolls 28 and 29 relative to the belt runs passing therebetween. Thus, the amount of material being transferred from the belts to the pads can be controlled by the opening between the belts and rolls at this zone. The rolls can have spring-loaded means (not shown) for applying a resilient force to one or both rolls.

The various rolls can be driven by motor 33 which drives chain or drive belt means 34 connected to sprocket or pulley wheel 35 for rotating shaft 14 and roll 12. Chain 36 is carried on another sprocket (not shown) on shaft 14 and drives a sprocket 37 for rotating roll 28. On the opposite side of the machine from that shown in FIG. 1, shafts or rolls 28 and 29 can carry mating spur gears so that upper roll 29 will be rotated with roll 28. The spur gears can have a tooth configuration permitting adjustment therebetween.

Medicant applied to upper belt 16 also will be transferred to lower belt 11 and onto nip roll 28. Such also can be accomplished, if needed, by running the belts before pads are processed. The medicant on the lower roll and belt will assist in applying impregnant to the bottom side of the gauze pad.

As previously mentioned, the invention is particularly suitable for applying medicant which might be separated or otherwise disturbed by melting. It has been found, however, that by applying a controlled amount of heat and pressure at the nip rolls, impregnation is assisted. In order to carry this out, a combination heater and doctor blade means 40 can be adjustably carried by a support 39 so that the spacing of the doctor knife portion 38 of the heater element can be adjusted as needed to apply the predetermined amount of medicant to the pad as it passes between the belts and the nip rolls.

One example of a material with which the pads are to be impregnated is O-tolylazo-O-tolylazo-$\beta$-naphthol (Merck Index) which is a powder which is mixed with lanolin, olive oil, petrolatum or other similar substance.

It should be apparent that variations in details of construction and arrangement of parts can be made without departing from the spirit of the invention except as defined in the appended claims.

1. In an apparatus for impregnating a gauze pad, the combination including a first movable belt for supporting a pad to be impregnated, a second movable belt movable in close proximity to said first belt, nip roll means straddling said two belts comprising an upper and lower roll between which mating surfaces of said belts move, means feeding impregnant to said second of said belts, said first belt carrying said pad into contact with said second belt and through said nip roll means so that impregnant will be deposited on said pad, heating means in a zone adjacent said nip roll means, and means for adjusting the distance between said rolls in accordance with the predetermined quantity of impregnant to be placed on said pad.

2. In an apparatus as claimed in claim 1 and including wiper means adjacent the lower nip roll on the side of the first belt away from the belt to which impregnant is applied.

3. In an apparatus as claimed in claim 1 wherein adjustable hopper means feeds impregnant to said first belt means.

* * * * *